United States Patent
Kim et al.

(10) Patent No.: US 10,432,057 B2
(45) Date of Patent: Oct. 1, 2019

(54) MOTOR AND BRAKE DEVICE INCLUDING SAME

(71) Applicant: LG INNOTEK CO., LTD., Seoul (KR)

(72) Inventors: Seong Jin Kim, Seoul (KR); Kyung Sang Park, Seoul (KR); Chang Hyun Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 15/760,128

(22) PCT Filed: Sep. 7, 2016

(86) PCT No.: PCT/KR2016/009997
§ 371 (c)(1),
(2) Date: Mar. 14, 2018

(87) PCT Pub. No.: WO2017/047969
PCT Pub. Date: Mar. 23, 2017

(65) Prior Publication Data
US 2018/0262080 A1    Sep. 13, 2018

(30) Foreign Application Priority Data
Sep. 18, 2015 (KR) .................. 10-2015-0132298

(51) Int. Cl.
*B60T 13/74*  (2006.01)
*H02K 5/22*   (2006.01)
(Continued)

(52) U.S. Cl.
CPC .............. *H02K 5/225* (2013.01); *B60T 13/74* (2013.01); *B60T 13/741* (2013.01); *H02K 5/10* (2013.01);
(Continued)

(58) Field of Classification Search
CPC .. H02K 5/00; H02K 5/04; H02K 5/08; H02K 5/10; H02K 5/15; H02K 5/16;
(Continued)

(56) References Cited

U.S. PATENT DOCUMENTS 4,727,274 A * 2/1988 Adam ................. H02K 5/12
                                                            310/239
7,823,384 B2 * 11/2010 Ikeda ................. B60T 13/746
                                                            60/545
(Continued)

FOREIGN PATENT DOCUMENTS

CN   103 950 445 A   7/2014
GB   2 221 102 A     1/1990
(Continued)

OTHER PUBLICATIONS

International Search Report in International Application No. PCT/KR2016/009997, filed Sep. 7, 2016.
(Continued)

*Primary Examiner* — Thomas J Williams
(74) *Attorney, Agent, or Firm* — Saliwanchik, Lloyd & Eisenschenk

(57) ABSTRACT

The present invention relates to a motor and a brake device including the same, wherein the motor including: a rotary shaft; a rotor part in which the rotary shaft is disposed at the center thereof; a stator part disposed on the outside of the rotor part; a housing accommodating the rotor part and the stator part, and having an opening formed at one side thereof; and a motor cover disposed at the opening of the housing, wherein the motor cover includes: a motor cover body; a first protruding part and a second protruding part, which are each formed at a predetermined location and configured to protrude in the radial direction from the center of the motor cover body; and a third protruding part formed to protrude from an edge of the motor cover body, and a
(Continued)

sealing part is further disposed between the second protruding part and the end portion of the housing disposed between the second protruding part and the third protruding part.

15 Claims, 17 Drawing Sheets

(51) Int. Cl.
- *H02K 5/10* (2006.01)
- *H02K 7/116* (2006.01)
- *H02K 5/16* (2006.01)
- *H02K 7/08* (2006.01)
- *H02K 7/102* (2006.01)
- *H02K 5/15* (2006.01)
- *H02K 5/173* (2006.01)

(52) U.S. Cl.
CPC .............. *H02K 5/15* (2013.01); *H02K 5/161* (2013.01); *H02K 5/1732* (2013.01); *H02K 7/083* (2013.01); *H02K 7/102* (2013.01); *H02K 7/116* (2013.01); *H02K 7/1166* (2013.01); *B60T 2270/30* (2013.01); *B60T 2270/82* (2013.01); *Y02T 10/641* (2013.01)

(58) Field of Classification Search
CPC ...... H02K 5/161; H02K 5/163; H02K 5/1732; H02K 5/1735; H02K 7/083; H02K 7/085; H02K 7/102; B60T 13/74; B60T 13/741

USPC .......................... 310/89, 90, 92, 93, 98, 400
See application file for complete search history.

(56) References Cited

U.S. PATENT DOCUMENTS

| | | | |
|---|---|---|---|
| 9,331,542 B2 * | 5/2016 | Nishijima | ................ H02K 5/10 |
| 2017/0237312 A1 * | 8/2017 | Stewart | ................ H02K 11/215 |
| | | | 310/68 B |
| 2018/0278114 A1 * | 9/2018 | Park | ........................ H02K 7/102 |

FOREIGN PATENT DOCUMENTS

| | | | | | |
|---|---|---|---|---|---|
| JP | 11089182 | A | * | 3/1999 | ............. H02K 11/00 |
| JP | 2011-073535 | A | | 4/2011 | |
| JP | 2014-039380 | A | | 2/2014 | |
| JP | 2015-502886 | A | | 1/2015 | |
| KR | 10-2010-0098847 | A | | 9/2010 | |
| KR | 10-2013-0009179 | A | | 1/2013 | |
| KR | 10-2013-0086439 | A | | 8/2013 | |
| WO | WO-99/65758 | A1 | | 12/1999 | |
| WO | WO-2013/083039 | A1 | | 6/2013 | |
| WO | WO-2014097109 | A1 | * | 6/2014 | ............... H02K 5/10 |
| WO | WO-2014/146338 | A1 | | 9/2014 | |

OTHER PUBLICATIONS

Supplementary European Search Report dated Feb. 27, 2019 in European Application No. 16846790.0.

* cited by examiner

MOTOR AND BRAKE DEVICE INCLUDING SAME

CROSS-REFERENCE TO RELATED APPLICATIONS

This application is the U.S. national stage application of International Patent Application No. PCT/KR2016/009997, filed Sep. 7, 2016, which claims priority to Korean Application No. 10-2015-0132298, filed Sep. 18, 2015, the disclosures of each of which are incorporated herein by reference in their entirety.

TECHNICAL FIELD

The present invention relates to a motor and a brake system including the same, and more particularly, to a motor provided with a motor cover configured to cover an opening of the motor with which a gear box is integrally formed, and a brake device including the same.

BACKGROUND ART

Generally, an EPB (electronic parking brake), which is an electronic parking brake, employs a switch-actuated motor, and thus it offers the convenience of not having to use a hand brake.

Referring to FIG. 1, an EPB system 2 may include a vacuum booster 3 including a motor and a master cylinder, an electronic stability control (ESC) 4, a vacuum pump 5, a cylinder and a pedal simulator configured to generate a driver's foot power, a solenoid valve configured to open or close a flow path, an ECU (electronic control unit) configured to control a pedal stroke sensor and the motor, and the like. Here, reference numeral 6 denotes a reserve.

Here, the booster is a device configured to boost the driver's foot power transmitted from a brake pedal to the master cylinder.

In addition, the ESC acting as a stability enhancement device of a vehicle may implement a function of generating a braking force of wheels.

However, since the vacuum booster 3, the ESC 4, and the vacuum pump 5 are employed as separate configurations so as to implement the EPB system 2, it is difficult to miniaturize and lighten the EPB system. In particular, since each of the vacuum booster 3, the ESC 4 and the vacuum pump 5 may be individually equipped with a motor, this configuration aggravates difficulty in miniaturization and lightening of the EPB system 2.

In addition, in the case of a hybrid electric vehicle or an electric vehicle, there is a problem in that vacuum of an engine may not be used.

Technical Problem

The present invention is directed to providing a brake device capable of braking a vehicle without a vacuum pump and implementing miniaturization and lightening thereof.

In addition, the present invention is directed to providing a motor configured to enable a gear to be mounted on one side thereof for the miniaturization and lightening of the brake device.

Further, the present invention is directed to providing a motor capable of inhibiting a terminal from being twisted by using a grommet, thereby minimizing an assembly failure rate of a connector connected to the terminal.

Furthermore, the present invention is directed to providing a motor including a motor cover, which covers an opening of a housing, to improve sealing performance.

The problems to be solved by the embodiments are not limited to the above-mentioned problems, and other problems which are not mentioned in the present specification may be clearly understood by those skilled in the art from the following description.

Technical Solution

One aspect of the present invention provides a motor including a rotary shaft; a rotor part in which the rotary shaft is disposed; a stator part disposed outside the rotor part; a housing configured to accommodate the rotor part and the stator part, and having an opening formed in one side thereof; and a motor cover disposed at the opening of the housing, wherein the motor cover may include a motor cover body; a first protruding part and a second protruding part, which are each formed at a predetermined location and configured to protrude in a radial direction from a center of the motor cover body; and a third protruding part formed to protrude from an edge of the motor cover body, and wherein a sealing part is further disposed between an end portion of the housing, which is disposed between the second protruding part and the third protruding part, and the second protruding part. Here, the end portion of the housing may be a stepped part.

The second protruding part may be formed to have a ring shape and protrude from the motor cover body.

The second protruding part may have an end portion formed in a round shape.

The second protruding part may be formed so that a part of a lower portion of an outer surface thereof is bent toward the third protruding part, the sealing part may be disposed to cover the end portion of the second protruding part, and one region of the sealing part may be disposed between an inner circumferential surface of the housing and an outer side surface of the second protruding part.

The sealing part may be formed in a ring shape having a ㄱ-shaped cross-section.

The sealing part may be provided as an O-ring, and an O-ring groove in which the O-ring is disposed may be formed in and have a step with an end portion of an inner circumferential surface of the opening of the housing.

The sealing part may be provided as an O-ring, and an O-ring groove in which the O-ring is disposed may be formed in an inner circumferential surface of the housing and spaced apart from an end portion of the opening of the housing by a predetermined distance.

The sealing part may be provided as an O-ring, and an O-ring groove in which the O-ring is disposed may be concavely formed at a corner at which an outer side surface of the second protruding part and the motor cover body meet.

An end portion of the third protruding part may be bent toward the housing.

The motor cover may further include a plurality of bent protruding portions formed along an end portion of the third protruding part and spaced apart from each other, and the bent protruding portions may be bent toward the housing.

The stator part may include a stator body; a terminal having one side disposed to be exposed to the outside of the housing; a bus bar portion disposed between the stator body and the terminal; and a conduction medium configured to electrically connect a coil end portion of the stator body and the other side of the terminal.

The conduction medium may be formed to be flexible.

The motor may further include a sealing guide part disposed to cover an opening formed in the other side of the housing and support one region of the stator part which is exposed to the outside. Here, the sealing guide part may include a grommet configured to support one region of the terminal and a sealing cap disposed to cover the opening formed in the other side of the housing, and the grommet may be fixed to the housing by a fixing member.

The motor may further include a sealing guide part disposed to cover an opening formed in the other side of the housing and support one region of the stator part which is exposed to the outside. Here, the sealing guide part may include a grommet configured to support one region of the terminal and a sealing cap disposed to cover the opening formed in the other side of the housing, and the grommet and the sealing cap may be integrally formed.

The housing may include a first accommodation recess in which the stator part and the rotor part are disposed; a second accommodation recess connected to the first accommodation recess to allow one end portion of the rotary shaft to be disposed therein; and a third accommodation recess connected to the second accommodation recess, and a gear may be disposed in the third accommodation recess.

The gear may be engaged with a thread formed at the one end portion of the rotary shaft to be rotated according to rotation of the rotary shaft.

In the first protruding part formed in a ring shape, a bearing pocket may be formed inside the first protruding part and a bearing may be disposed in the bearing pocket.

Another aspect of the present invention provides a brake device including a motor provided as the above-described motor; a master cylinder configured to be actuated according to operation of the motor; and an electronic stability control (ESC), and the motor may be provided as the above-described motor.

Advantageous Effects

A motor according to an embodiment of the present invention can include a motor cover, which covers an opening of a housing, to support a rotary shaft disposed in the housing while sealing the housing.

In addition, unlike a conventional brake device in which a gear and a motor are separately formed, the motor includes the integral type housing formed to enable a gear connected to one side of a rotor part to be disposed therein, and thus the housing can be sealed without a separate sealing member.

Furthermore, by using a sealing guide part, an opening of the housing can be covered and sealed, and a terminal of a stator part can also be supported.

In addition, a motor can inhibit a terminal from being twisted by using a grommet of the sealing guide part, and accordingly it is possible to minimize an assembly failure rate of a connector connected to the terminal.

Furthermore, a weight of a grommet of a sealing guide part may act only in a longitudinal direction of a terminal. In addition, since the weight acting in the longitudinal direction of the terminal is dispersed or removed by a conduction medium, damage can be inhibited after fusing.

In addition, since a sealing guide part and a sealing cap can be integrally formed, it is possible to simplify an assembling process.

MODES OF THE INVENTION

Figure 1:
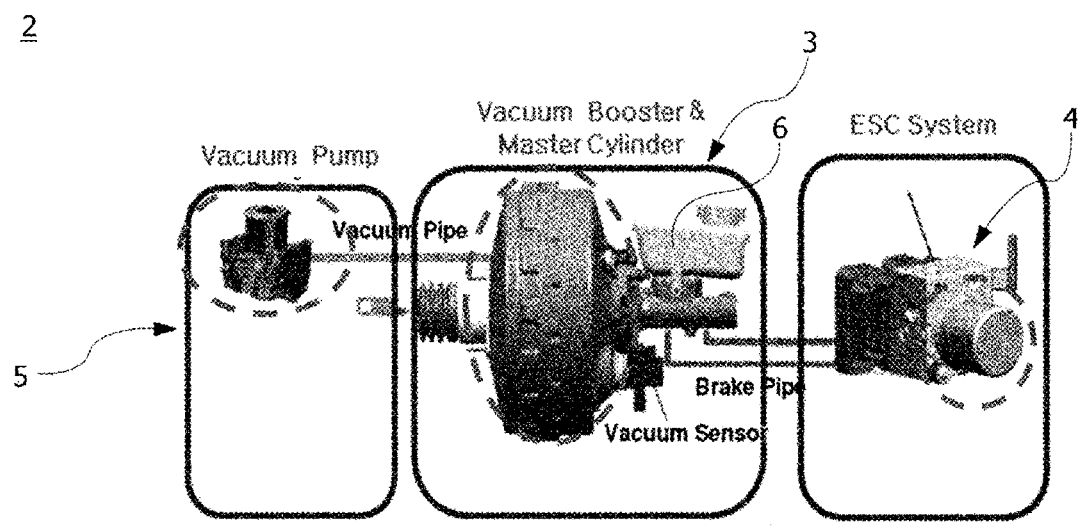
FIG. 1 is a view showing a conventional brake system.
Figure 2:
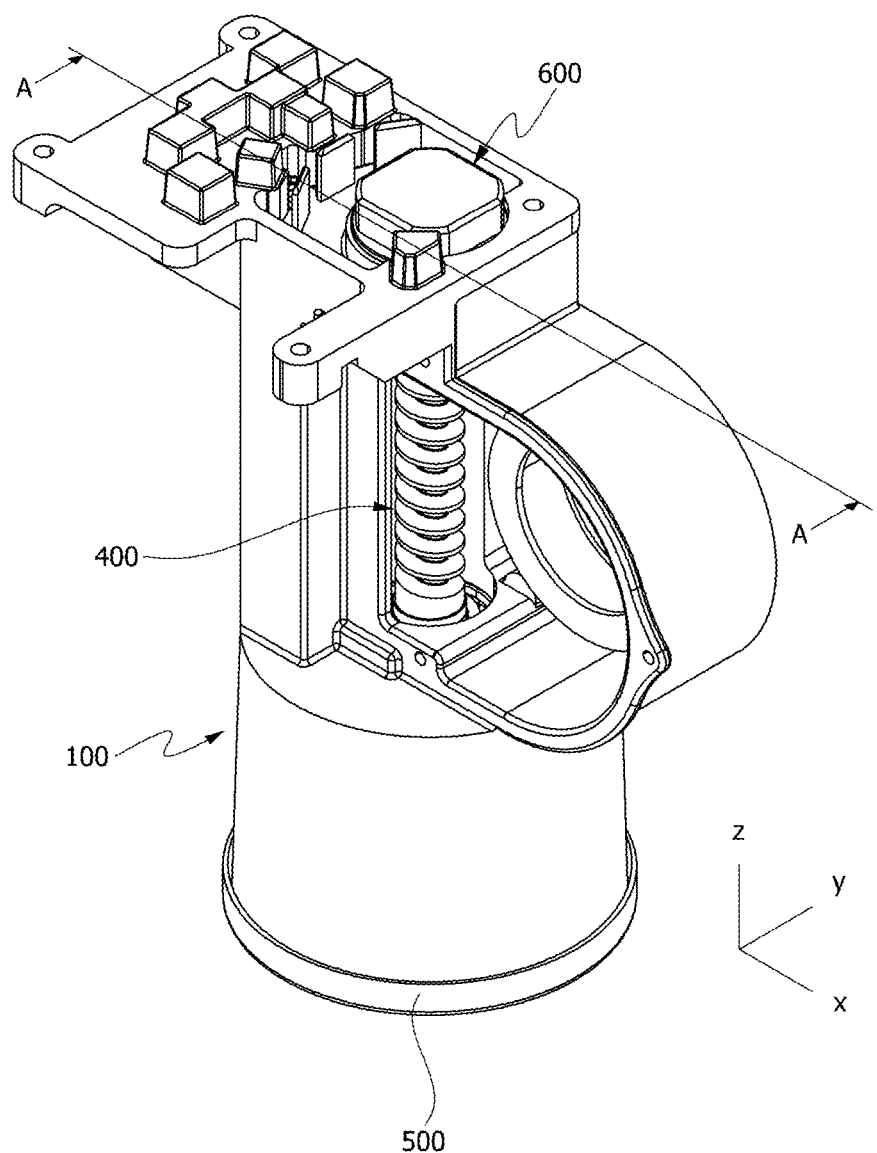
FIG. 2 is a perspective view showing a motor according to an embodiment.

While the present invention may be variously modified and have various embodiments, specific embodiments thereof will be exemplarily illustrated in the drawings and described therein. However, it should be understood that the present invention is not to be limited to the specific embodiments, but includes all modifications, equivalents or substitutes falling within the spirit and scope of the present invention.

Terms including an ordinal number such as "second," "first," etc. may be used to describe various components, but the above components are not limited by the terms. The terms are used merely for the purpose of distinguishing one component from another component. For example, a second component may be referred to as a first component, and similarly, a first component may also be referred to as a second component without departing from the scope of right of the present invention. The term "and/or" includes a combination of a plurality of associated listed items or any one of the plurality of associated listed items.

It should be understood that when any component is referred to as being "connected" or "coupled" to another component, the component may be directly connected or coupled to another component, but any intervening component may be present between these components. In contrast, it should be understood that when any component is referred to as being "directly connected" or "directly coupled" to another component, there is no intervening component between these components.

In the description of the embodiment, when any one component is referred to as being formed "on (above) or under (below)" another component, the term "on (above) or under (below)" includes both components directly contacting each other or one or more other components being indirectly formed between the two components. In addition, "on (above) or under (below)" may include a meaning of an upward direction as well as a downward direction with respect to one component.

The terms used in the present specification are used only to describe the specific embodiments and are not intended to restrict the present invention. Unless clearly used otherwise, singular expressions include a plural meaning. It should be understood that, in this specification, the term "comprise" or "have" etc. specifies the presence of a stated feature, number, step, operation, component, element, or combination thereof described herein, but do not preclude the presence or addition of one or more other features, numbers, steps, operations, components, elements, or combinations thereof.

Unless otherwise defined, all terms including technical and scientific terms used herein have the same meaning as commonly understood by one of ordinary skill in the art to which the present invention pertains. The terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings, wherein, regardless reference numerals, the same or corresponding components are denoted by the same reference numerals, and overlapping description thereon will be omitted.

Referring to FIGS. 2 to 14, since a motor 1 according to an embodiment includes a housing integrally formed with a gear 10 to be installed at one side thereof, the number of components related to a sealing may be minimized.

The motor 1 may include a housing 100 having openings formed in one side and the other side thereof, a stator part 200 disposed in the housing 100, a rotor part 300 rotatably disposed in the stator part 200, a rotary shaft 400 rotated together with the rotor part 300, a motor cover 500 coupled to the housing 100, sealing guide parts 600 and 600a, a sensor magnet assembly 700, and a sealing part. Here, the rotary shaft 400 may be disposed at a center of the rotor part 300. For example, the rotary shaft 400 may be disposed in a hole formed at the center of the rotor part 300.

The stator part 200 and the rotor part 300 may be accommodated in the housing 100. In addition, the rotary shaft 400 disposed at the center of the rotor part 300 may be accommodated in the housing 100.

The housing 100 may include a first accommodation recess 110 in which the stator part 200 and the rotor part 300 are disposed, a second accommodation recess 120 configured to communicate with the first accommodation recess 110 to allow one end portion of the rotary shaft 400 to be disposed therein, a third accommodation recess 130 disposed to communicate with the second accommodation recess 120, and a stepped part 140. In addition, the housing 100 may further include an O-ring groove 150.

An opening 111 is formed in one side of the first accommodation recess 110, and the stator part 200, the rotor part 300 and the rotary shaft 400 may be inserted through the opening 111. Here, the first accommodation recess 110 may be formed in a cylindrical shape with a size which allows the stator part 200 to be inserted and then disposed.

In addition, a first through hole 113 is formed in a supporting face 112 formed on the one side of the first accommodation recess 110, and thus the first accommodation recess may be disposed to communicate with the second accommodation recess 120. Accordingly, the one end portion of the rotary shaft 400 inserted into the first accommodation recess 110 may pass through the first accommodation recess 110 and be disposed in the second accommodation recess 120 through the first through hole 113.

The one end portion of the rotary shaft 400 inserted through the first accommodation recess 110 may be disposed in the second accommodation recess 120. Accordingly, the second accommodation recess 120 may be formed to have a diameter smaller than that of the first accommodation recess 110.

The third accommodation recess 130 may include a space formed to enable the gear 10 to be mounted therein. With respect to the second accommodation recess 120, an extension direction (direction Z) of the first accommodation recess 110 and an extension direction (direction X) of the third accommodation recess 130 may be arranged perpendicular to each other. That is, the first accommodation recess 110 and the third accommodation recess 130 may be disposed perpendicular to each other with respect to the second accommodation recess 120.

The third accommodation recess 130 may be connected to the second accommodation recess 120 to communicate with each other. For example, the housing 100 may include a second through hole formed between the second accommodation recess 120 and the third accommodation recess 130, and the third accommodation recess 130 may be connected to the second accommodation recess 120 through the second though hole to communicate with each other.

The housing 100 may be a single component having the first accommodation recess 110, the second accommodation recess 120, and the third accommodation recess 130 formed therein. The housing 100 may be manufactured by a molding method such as injection molding.

Therefore, since the first accommodation recess 110, the second accommodation recess 120, and the third accommodation recess 130 are integrally formed in the housing 100, the motor 1 has a simple structure and is easy to manufacture.

In addition, since the motor 1 includes the third accommodation recess 130 integrally formed therewith to enable the gear 10 to be installed at one side thereof, the number of components related to a sealing is minimized, and there is no need to provide a separate gear box, and thus it is possible to miniaturize the motor.

The stepped part 140 may be formed to protrude from an end portion of the opening 111 of the housing 100 along an outer circumferential surface.

Figure 6A:
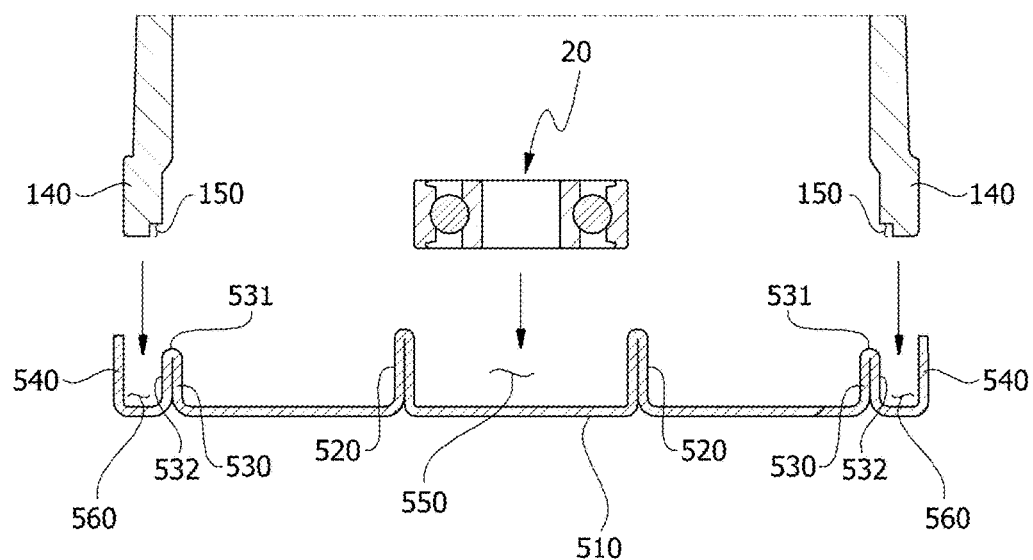
FIG. 6A is a view showing a state before a housing, a bearing and a motor cover of the motor according to the embodiment are coupled.
Figure 12A:
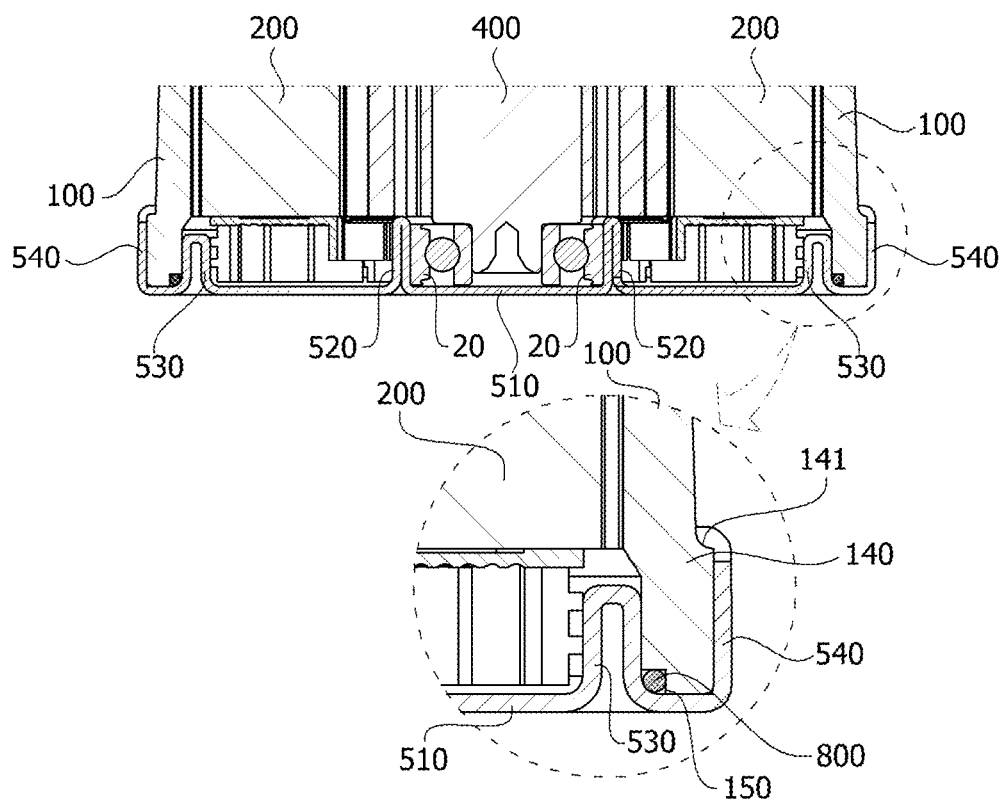
FIG. 12A is a view showing one example of an O-ring groove formed in the housing of the motor according to the embodiment.
Figure 12B:
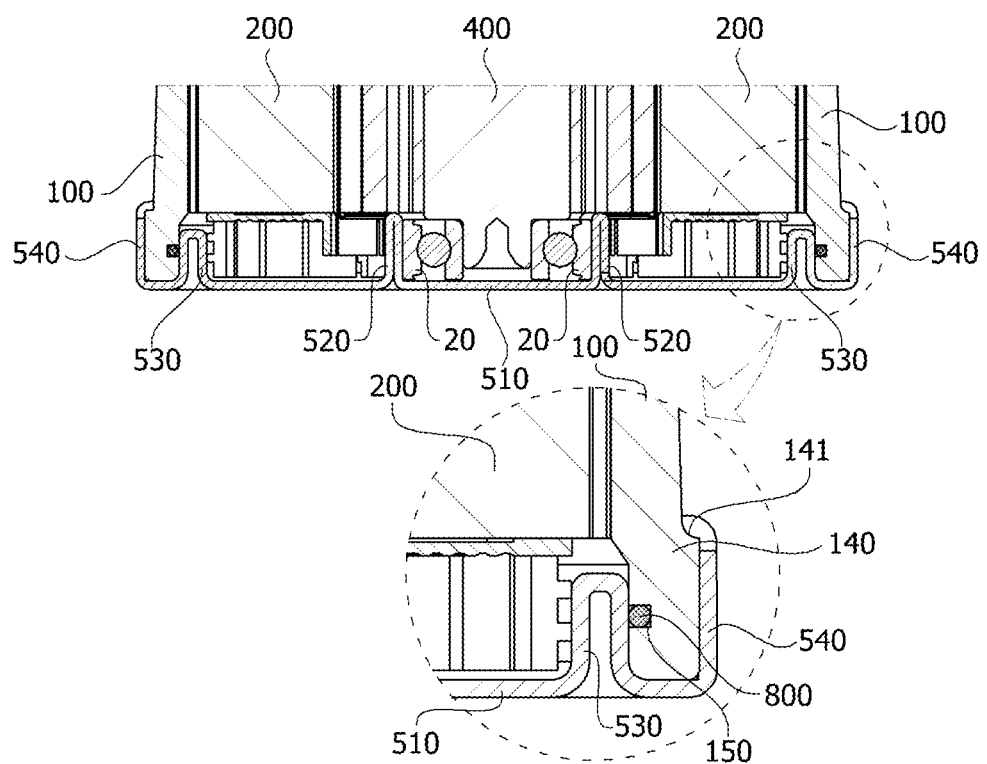
FIG. 12B is a view showing another example of the O-ring groove formed in the housing in the motor according to the embodiment.

The O-ring groove 150 may be formed in an inner circumferential surface of the housing 100 corresponding to the stepped part 140. For example, as illustrated in FIGS. 6A and 12A, the O-ring groove 150 may be formed in and have a step with an end portion of an inner circumferential surface of the stepped part 140. In addition, as shown in FIG. 12B, the O-ring groove 150 may be formed in the inner circumferential surface of the stepped part 140 spaced apart from the end portion of the stepped part 140 by a predetermined distance.

The stator part 200 may be disposed outside the rotor part 300.

The stator part 200 may have a known shape in which a coil is wound around a stator core. For example, in the stator part 200, a coil may be wound around an integral type stator core or a coil may be wound around a plurality of divided stator cores.

Figure 4:
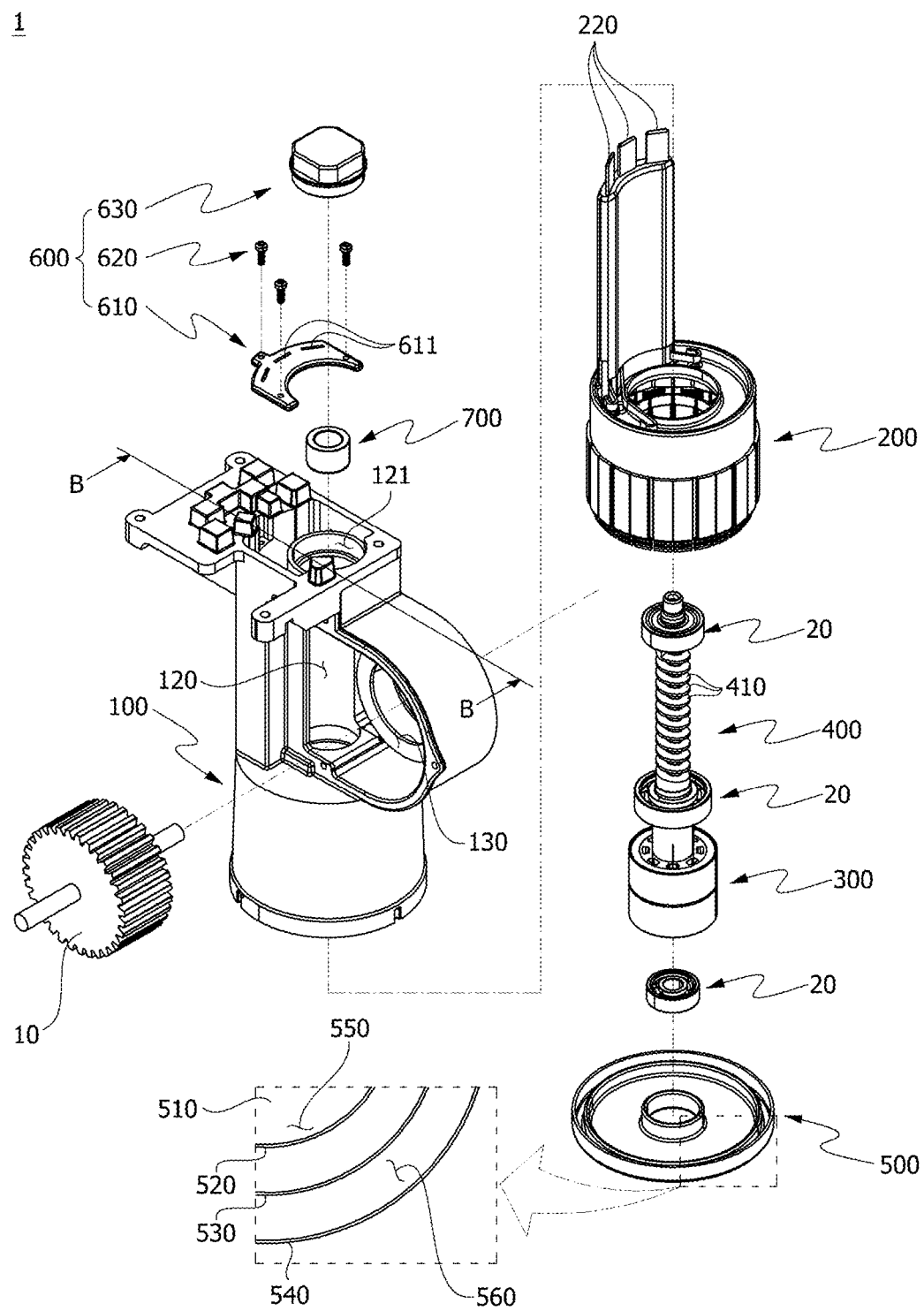
FIG. 4 is an exploded perspective view showing the motor according to the embodiment.
Figure 5:
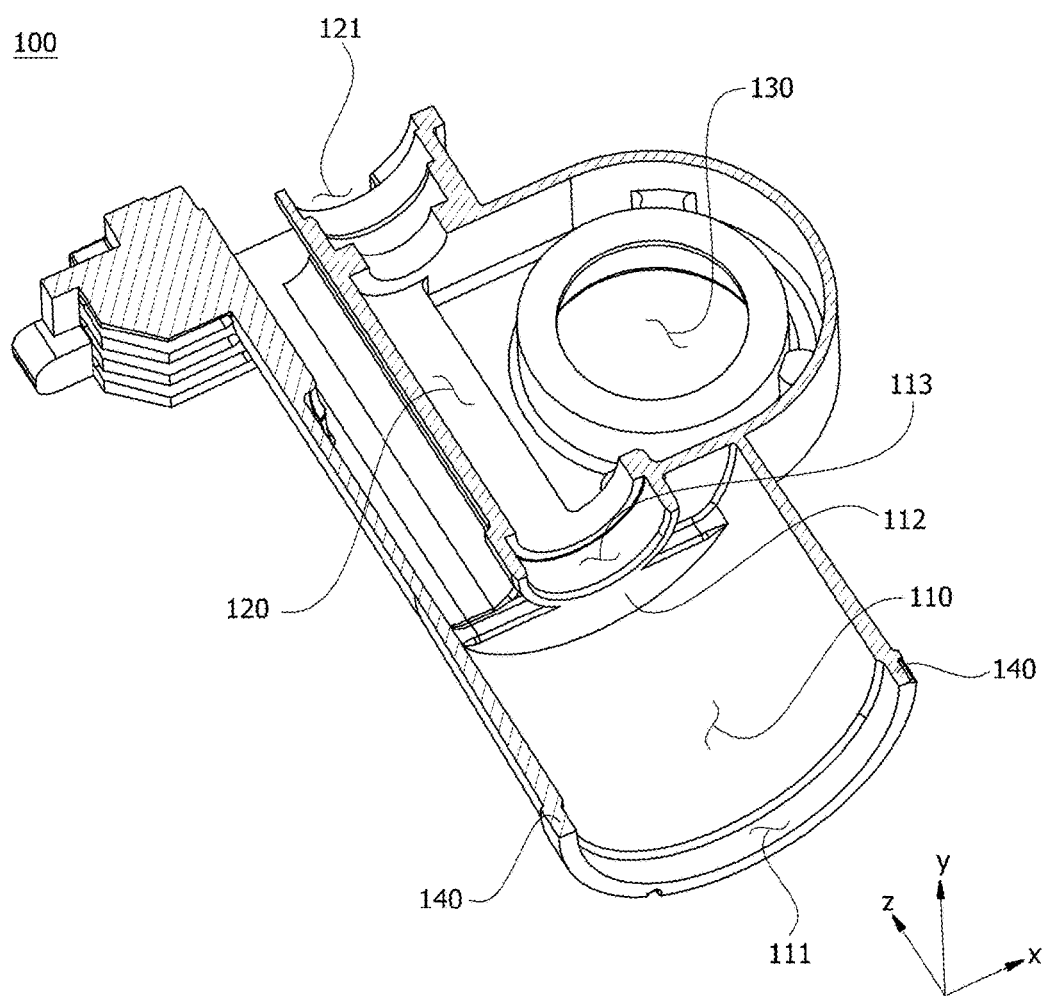
FIG. 5 is a cross-sectional view taken along line B-B in FIG. 4.
Figure 7:
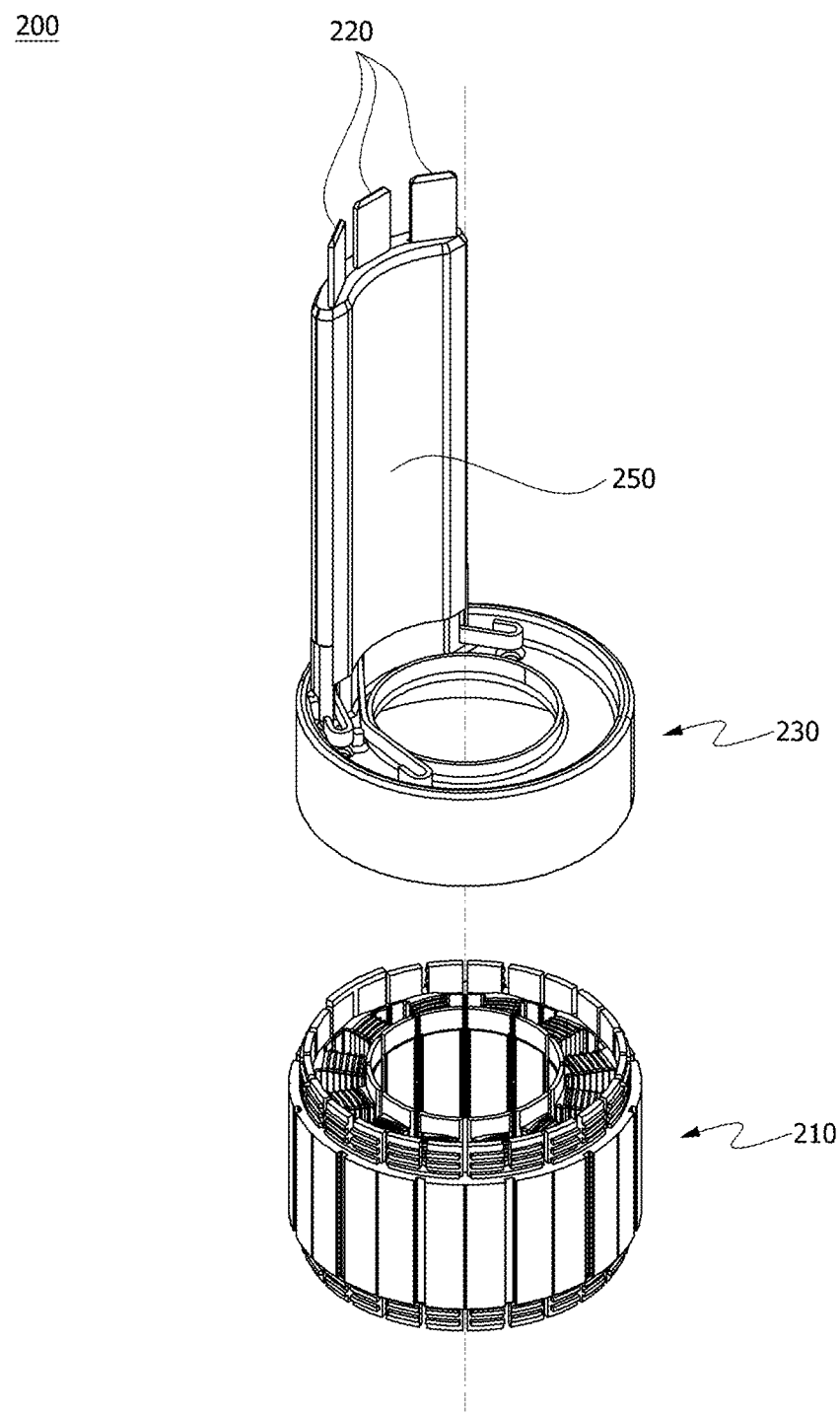
FIG. 7 is a perspective view showing a stator part of the motor according to the embodiment.
Figure 8:
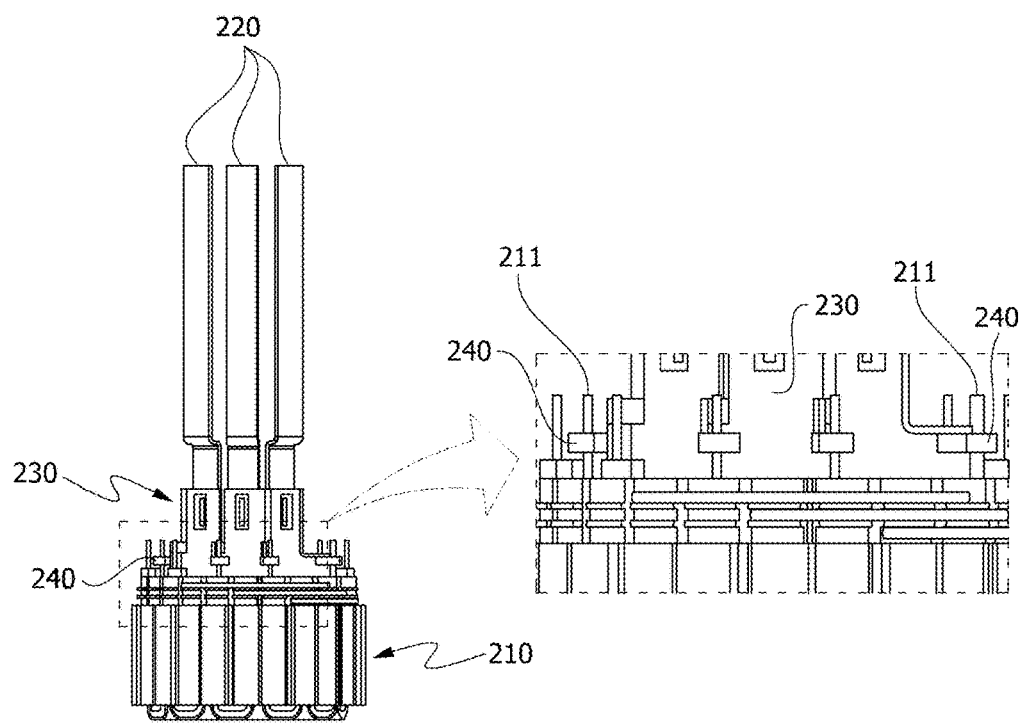
FIG. 8 is a front view showing the stator part of the motor according to the embodiment.

Referring to FIGS. 4, 7, and 8, the stator part 200 may include a stator body 210 around which a coil is wound, a bar-shaped terminal 220, a bus bar portion 230, a conduction medium 240, and a terminal cover 250.

The stator body 210 may have a configuration in which a coil 211 is wound around an integral type stator core or a configuration in which the coil 211 is wound around a plurality of divided stator cores. Furthermore, as illustrated in FIG. 8, one end of the coil 211 may be disposed and exposed to the outside to be electrically connected to the terminal 220.

The terminal 220 may be formed in an elongated bar shape to be electrically connected to the stator body 210. Here, the terminal 220 may be formed to have a length corresponding to that of the rotary shaft 400. In addition, one region of the terminal 220 formed in a bar shape may be bent to be coupled with the bus bar portion 230.

The bus bar portion 230 may be disposed between the stator body 210 and the terminal 220. Therefore, the bus bar portion 230 may support one side of the terminal 220.

The conduction medium 240 may be disposed between the one end of the coil 211 and the terminal 220. In addition, the conduction medium 240 allows the coil 211 and the terminal 220 to be electrically connected to each other. For example, the conduction medium 240 and the coil 211 or the conduction medium 240 and the terminal 220 may be electrically connected to each other by fusing.

In addition, the conduction medium 240 may be formed to be flexible. For example, the conduction medium 240 may be formed in the form of a twisted wire of a flexible material such as copper or a copper alloy.

Therefore, since the conduction medium 240 is formed of a flexible material having flexibility, when a load is exerted on the terminal 220, the load of the terminal 220 may be dispersed or removed to inhibit a connection obtained by the fusing from being released.

The terminal cover 250 may be disposed to surround the terminal 220 to protect the terminal 220.

The rotor part 300 may include a cylindrical rotor core and a plurality of magnets attached to the rotor core. The rotor part 300 may be rotated by electromagnetic interaction between the rotor part and the stator part 200.

The rotary shaft 400 may be fixedly inserted into the rotor part 300 to be integrally rotated with the rotor part 300. A thread 410 may be formed at the one end portion of the rotary shaft 400, and thus the rotary shaft may be rotated in conjunction with the gear 10. That is, the gear 10 may be rotated according to rotation of the rotary shaft 400.

Since a bearing 20 may be disposed on an outer circumferential surface of the rotary shaft 400, the rotary shaft 400 may be rotated in the housing 100.

Here, the rotary shaft 400 may be formed in an elongated cylindrical shape. In addition, one side of the rotary shaft 400 may be supported by the motor cover 500 and the other side may be supported by the sealing guide part 600.

The motor cover 500 may be coupled to the opening 111 formed in the one side of the housing 100 to seal the stator part 200, the rotor part 300 and the rotary shaft 400 in the first accommodation recess 110.

Hereinafter, the motor cover 500 according to the embodiment will be described with reference to FIGS. 4, 6A, and 6B.

The motor cover 500 may further include a circular plate-shaped motor cover body 510, a first protruding part 520 and a second protruding part 530 formed at predetermined locations and configured to protrude in a radial direction from a center of the motor cover body 510, a third protruding part 540 formed to protrude from an edge of the motor cover body 510, a bearing pocket 550, and a housing fixing groove 560 in which the stepped part 140 is disposed. Here, the first protruding part 520, the second protruding part 530, and the third protruding part 540 may be formed to protrude in the same direction. In addition, the first protruding part 520, the second protruding part 530 and the third protruding part 540 may be formed to be bent.

As illustrated in FIG. 4, the first protruding part 520 may be spaced from the center of the motor cover body 510 and may protrude. Furthermore, the first protruding part 520 may protrude in a ring shape. Accordingly, the bearing pocket 550 may be formed inside the first protruding part 520. In addition, the bearing 20 may be disposed in the bearing pocket 550.

The second protruding part 530 may be formed to protrude between the first protruding part 520 and the third protruding part 540. In addition, the second protruding part 530 may be formed to be spaced apart from the third protruding part 540 by a predetermined distance. Furthermore, the second protruding part 530 may protrude in a ring shape to seal.

In addition, an end portion 531 of the second protruding part 530 may be formed in a round shape by rounding the end portion or bending the second protruding part 530, which protrudes in one direction, in a direction opposite the one direction.

The end portion 531 formed in a round shape allows the stepped part 140 to be easily installed in the housing fixing groove 560. For example, an inner surface of the stepped part 140 may be guided by the end portion 531 to be easily inserted along an outer surface 532 of the second protruding part 530.

Figure 6B:
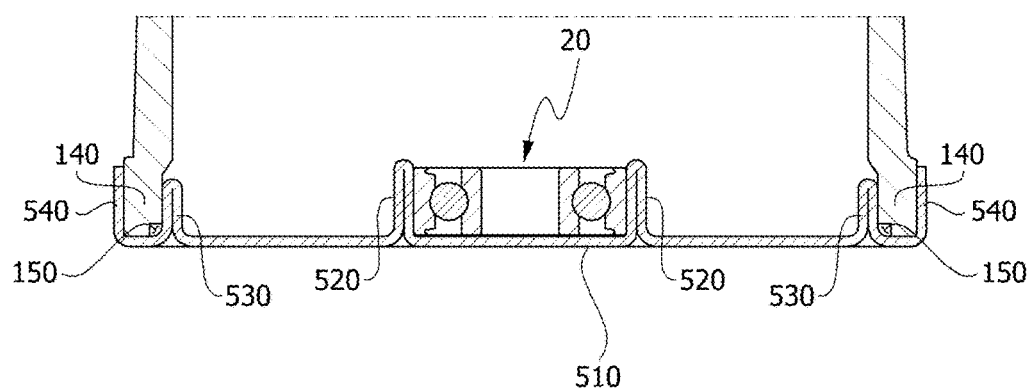
FIG. 6B is a view showing a state after the housing, the bearing and the motor cover of the motor according to the embodiment are coupled.

Referring to FIGS. 4, 6A, and 6B, the third protruding part 540 may be formed in a ring shape and configured to protrude from the edge of the motor cover body 510. Accordingly, the housing fixing groove 560 may be formed between the second protruding part 530 and the third protruding part 540. In addition, the stepped part 140 may be disposed in the housing fixing groove 560.

After the stepped part 140 is disposed in the housing fixing groove 560, an end portion of the third protruding part 540 may be bent by a caulking process or the like. Therefore, since one side of the end portion of the third protruding part 540 becomes in close contact with a step 141 of the stepped part 140, the motor cover 500 may be fixed to the housing 100. Furthermore, when the sealing part is disposed between the second protruding part 530 and the housing 100, a sealing force may be further improved through the caulking process by which the housing 100 and the motor cover 500 are in close contact with each other.

Figure 9:
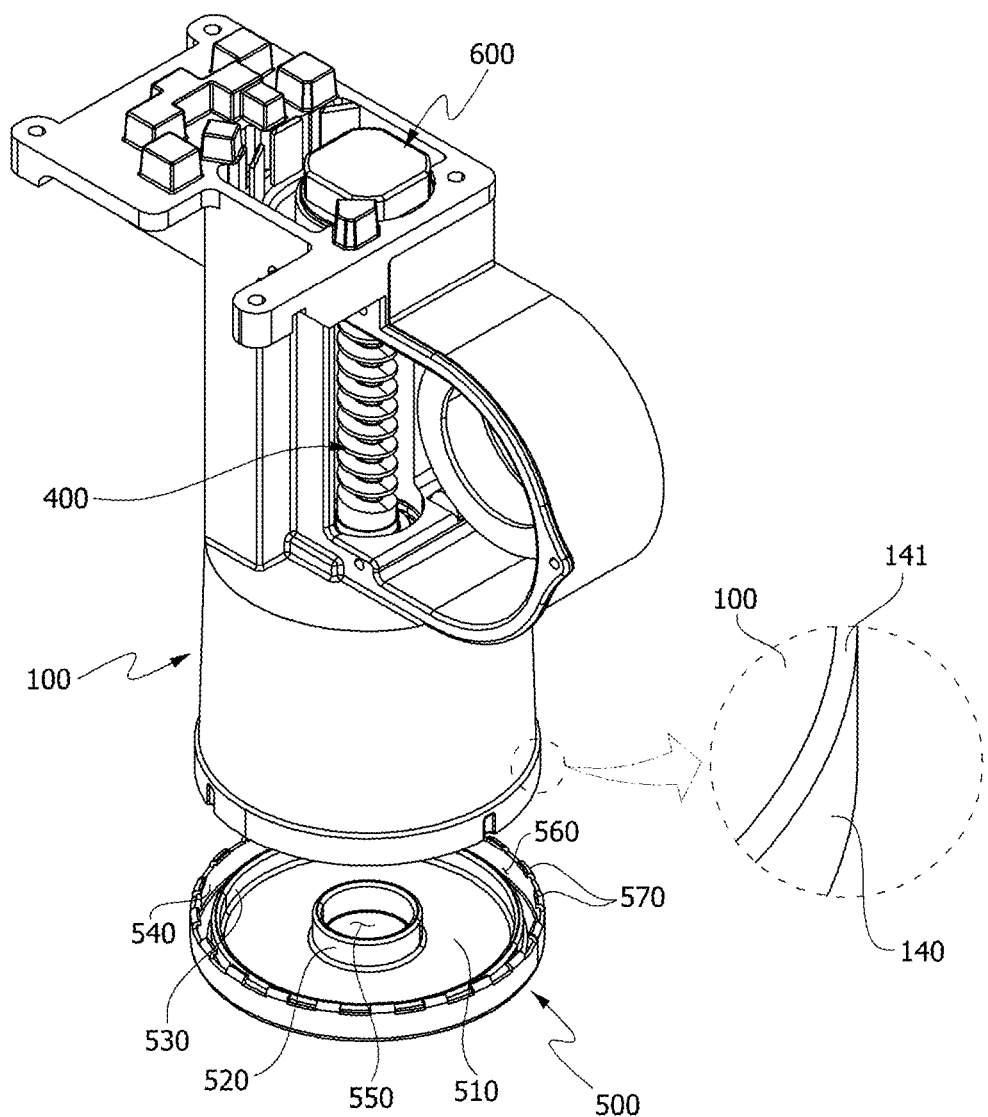
FIG. 9 is a view showing bent protruding portions formed on the motor cover of the motor according to the embodiment.
Figure 10A:
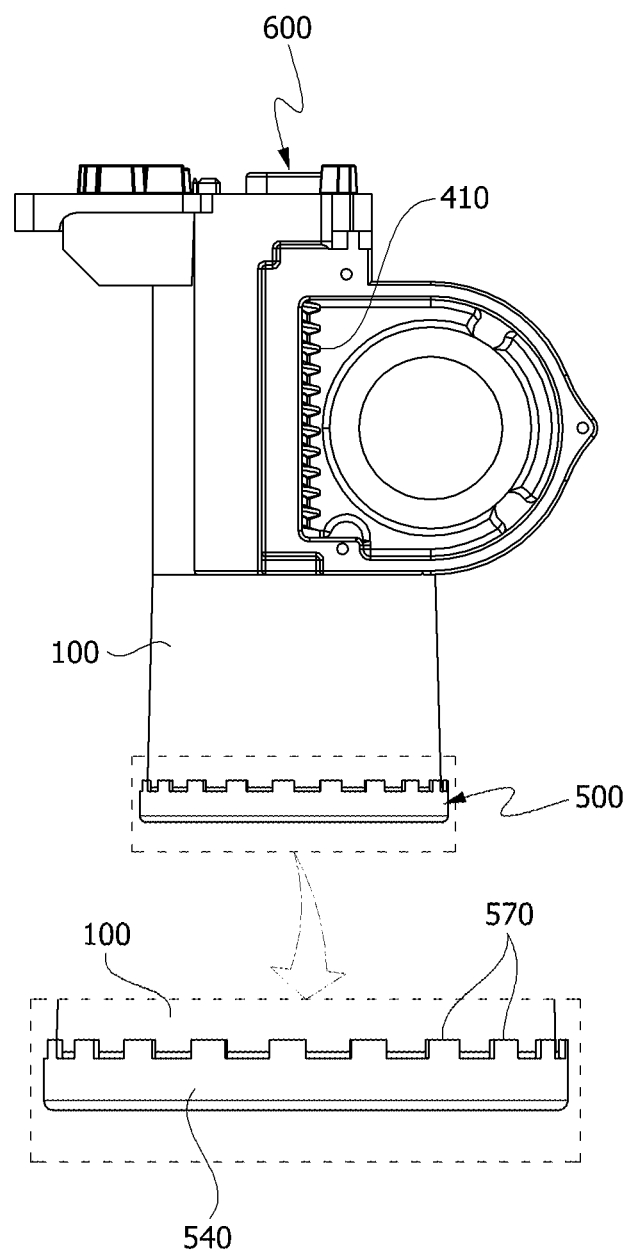
FIG. 10A is a view showing a state before the motor cover is fixed to the housing of the motor according to the embodiment.
Figure 10B:
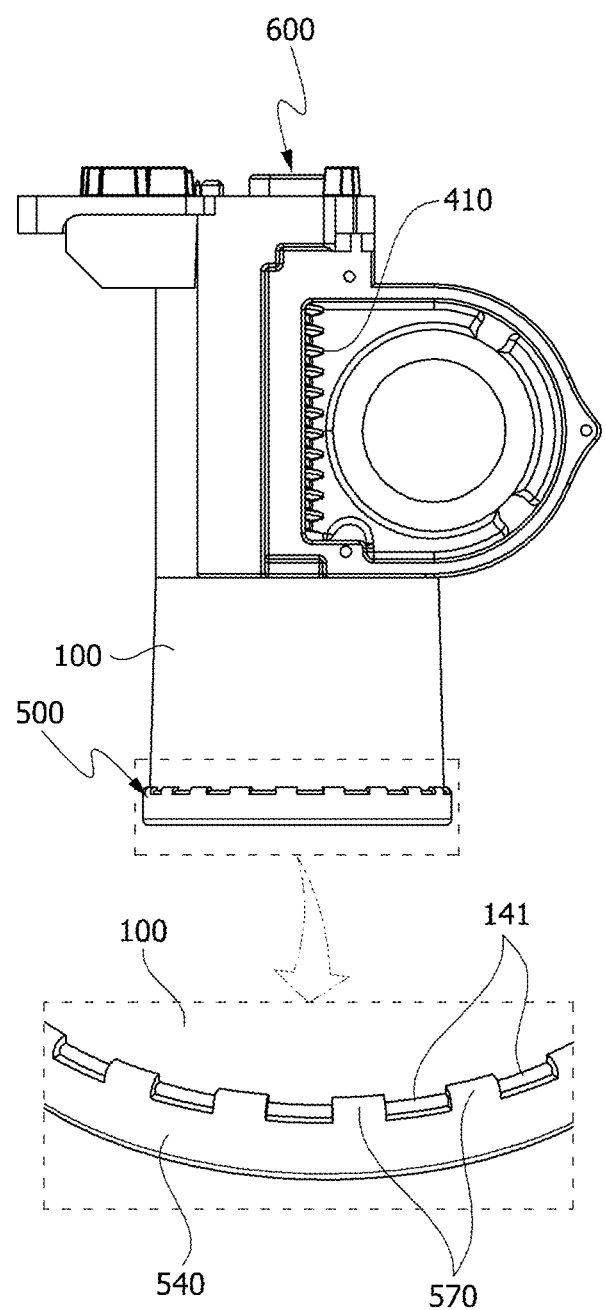
FIG. 10B is a view showing a state after the motor cover is fixed to the housing of the motor according to the embodiment.

Meanwhile, referring to FIGS. 9, 10A, and 10B, the motor cover 500 may further include a plurality of bent protruding portions 570 disposed along an end portion of the third protruding part 540 and spaced apart from each other.

By arranging the plurality of bent protruding portions 570 to be spaced apart from each other by a predetermined distance, shape deformation of the third protruding part 540 caused by the caulking process may be inhibited when the bent protruding portions 570 are bent.

For example, as illustrated in FIG. 10A, after the stepped part 140 is disposed in the housing fixing groove 560, the bent protruding portions 570 of the third protruding part 540 may be bent by the caulking process or the like. Accordingly, as illustrated in FIG. 10B, the bent protruding portions 570 of the third protruding part 540 come in close contact with the step 141 of the stepped part 140, and thus the motor cover 500 may be fixed to the housing 100.

The sealing guide parts 600 and 600a may inhibit grease introduced into the gear 10 from leaking to the outside through the rotary shaft 400 and at the same time support the terminal 220.

The sealing guide parts 600 and 600a differ from each other depending on whether the sealing guide portions are integrally formed or fixed by separate fixing members, and each of the sealing guide parts 600 and 600a will be described with reference to the accompanying drawings.

Figure 3:
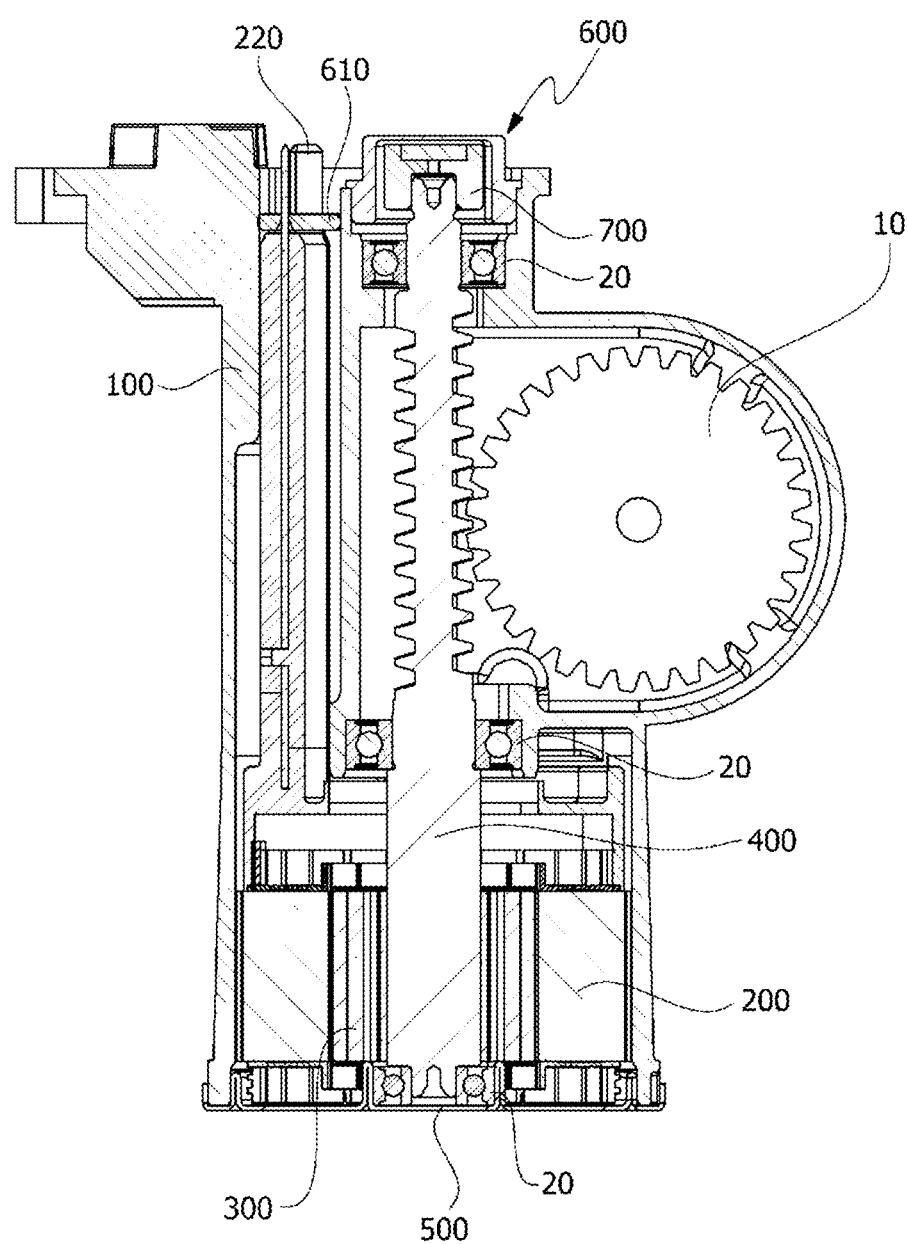
FIG. 3 is a cross-sectional view taken along line A-A in FIG. 2.

Referring to FIGS. 3 and 4, the sealing guide part 600 according to the embodiment may include a grommet 610, a fixing member 620, and a sealing cap 630.

As illustrated in FIG. 4, the grommet 610 may include a through hole 611 formed to enable an end portion of the terminal 220 to pass therethrough and to be coupled thereto. In addition, the grommet 610 may be fixed to the one side of the housing 100 by the fixing member 620. Here, a bolt, a screw, or the like may be employed as the fixing member 620.

One end of the elongated terminal 220 formed in a bar shape may be supported by the grommet 610. Accordingly, a load exerted on the terminal 220 may be applied only in a longitudinal direction of the terminal 220 by the grommet 610. In addition, since the load exerted on the terminal 220 in the longitudinal direction is dispersed or removed by the conduction medium 240, burning caused by the fusing may be inhibited.

Since the grommet 610 may inhibit the terminal 220 from being twisted by the through hole 611, it is possible to minimize an assembly failure rate of a connector (not shown) connected to the terminal 220.

The sealing cap 630 may be disposed to cover the opening 121 formed in the one side of the housing 100.

The sealing cap 630 may inhibit the grease introduced into the gear 10 from leaking to the outside through the opening 121 along the rotary shaft 400. Here, the sealing cap 630 may be press-fitted into the opening 121.

Figure 11:
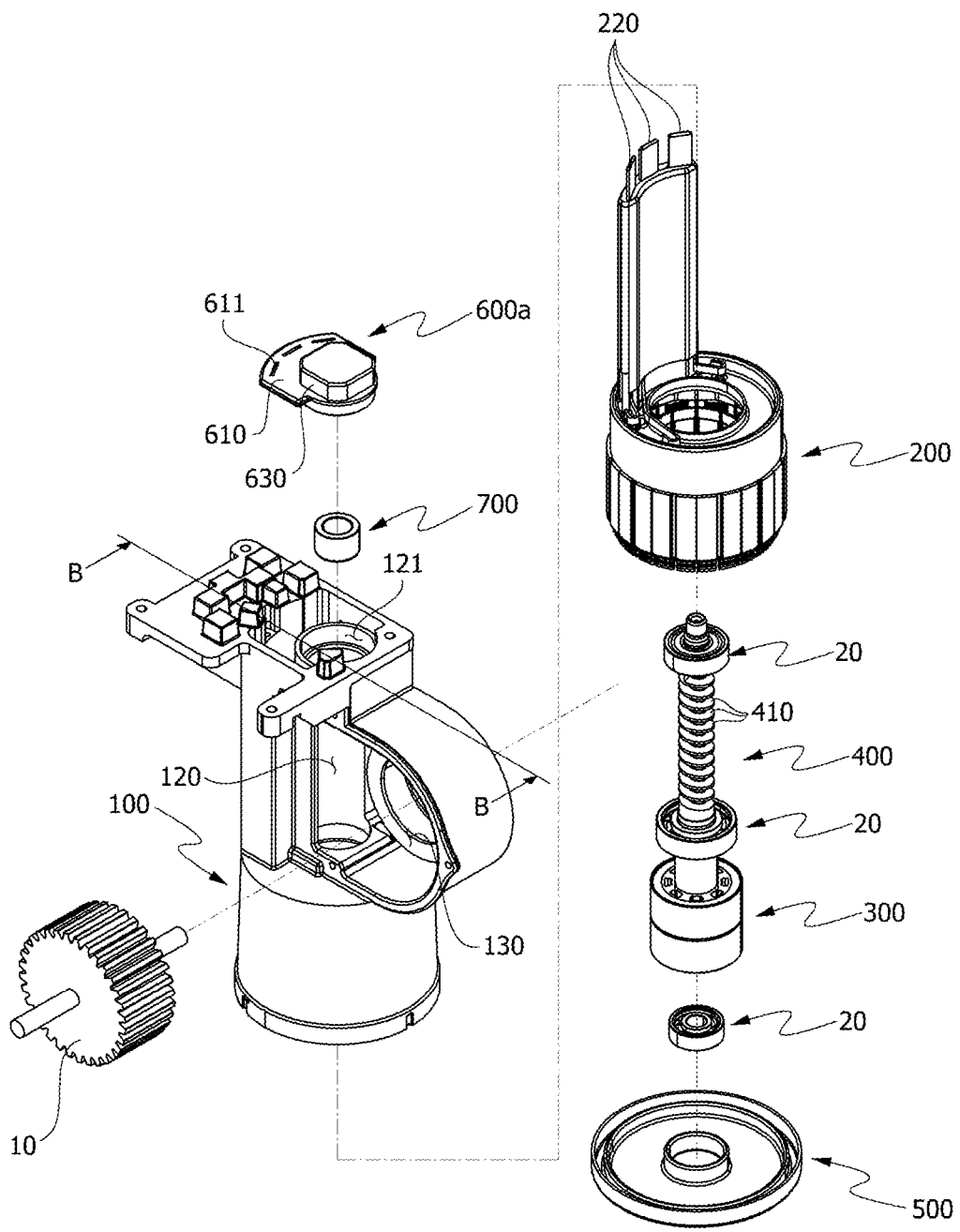
FIG. 11 is an exploded perspective view showing a sealing guide part according to another embodiment.

Referring to FIG. 11, unlike the above-described sealing guide part 600, in a sealing guide part 600a according to another embodiment, a grommet 610 and a sealing cap 630 may be integrally formed. Here, the sealing guide part 600a may be press-fitted into an opening 121 without a fixing member 620.

Therefore, it is possible to simplify an assembling process of the sealing guide part 600a by integrally forming the grommet 610 and the sealing cap 630.

A sensor magnet assembly 700 may be disposed between one end portion of a rotary shaft 400 and the sealing cap 630 of the sealing guide part 600.

On the other hand, the sealing part may seal a gap between a housing 100 and a motor cover 500.

Here, an O-ring 800 disposed between an inner circumferential surface of the housing 100 and a second protruding part 530 of the motor cover 500 may be provided as the sealing part.

In addition, the housing 100 or the motor cover 500 may include an O-ring groove to allow the O-ring 800 to be disposed at a predetermined position.

Figure 13:
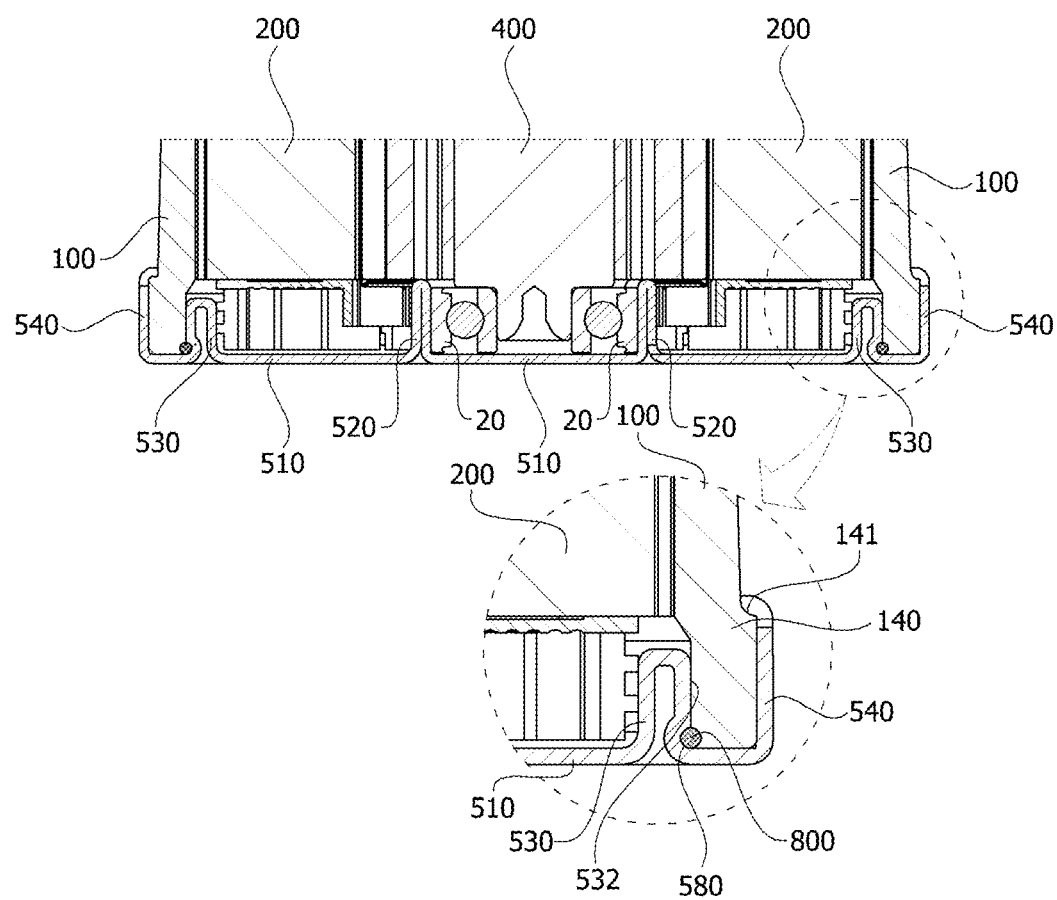
FIG. 13 is a view showing the O-ring groove formed in a second protruding part of the motor cover in the motor according to the embodiment.

Referring to FIGS. 12A, 12B and 13, the above-described O-ring may be disposed between the inner circumferential surface of the housing 100 and the second protruding part 530 of the motor cover 500.

An O-ring groove 150 may be formed in the inner circumferential surface of the housing 100, and as illustrated in FIGS. 6A and 12A, the O-ring groove 150 may be formed in and have a step with an end portion of an inner circumferential surface of the stepped part 140.

In addition, as illustrated in FIG. 12B, the O-ring groove may be formed to be spaced apart from the end portion of the inner circumferential surface of the stepped part 140 by a predetermined distance.

When the O-ring groove 150 is formed in and has a step with the end portion of the inner circumferential surface of the housing 100, sealing performance may be further improved by the caulking process.

In addition, when the O-ring groove 150 is formed to be spaced apart from the end portion of the inner circumferential surface of the stepped part 140 by the predetermined distance, there is no need to consider detachment of the O-ring 800 according to a coupling of the housing 100 and the motor cover 500. That is, when the O-ring groove 150 is formed to be spaced apart from the end portion of the inner circumferential surface of the housing 100 by the predetermined distance, it is easier to assemble the housing 100 and the motor cover 500 without detachment of the O-ring 800.

Referring to FIG. 13, the above-described O-ring groove may be formed in the motor cover 500.

As illustrated in FIG. 13, an O-ring groove 580 may be concavely formed in a corner at which the outer surface 532 of the second protruding part 530 and the motor cover body 510 meet. In addition, the O-ring 800 may be disposed in the O-ring groove 580.

Therefore, when the O-ring 800 is disposed in the O-ring groove 580, the sealing performance may be further improved by the caulking process.

Figure 14:
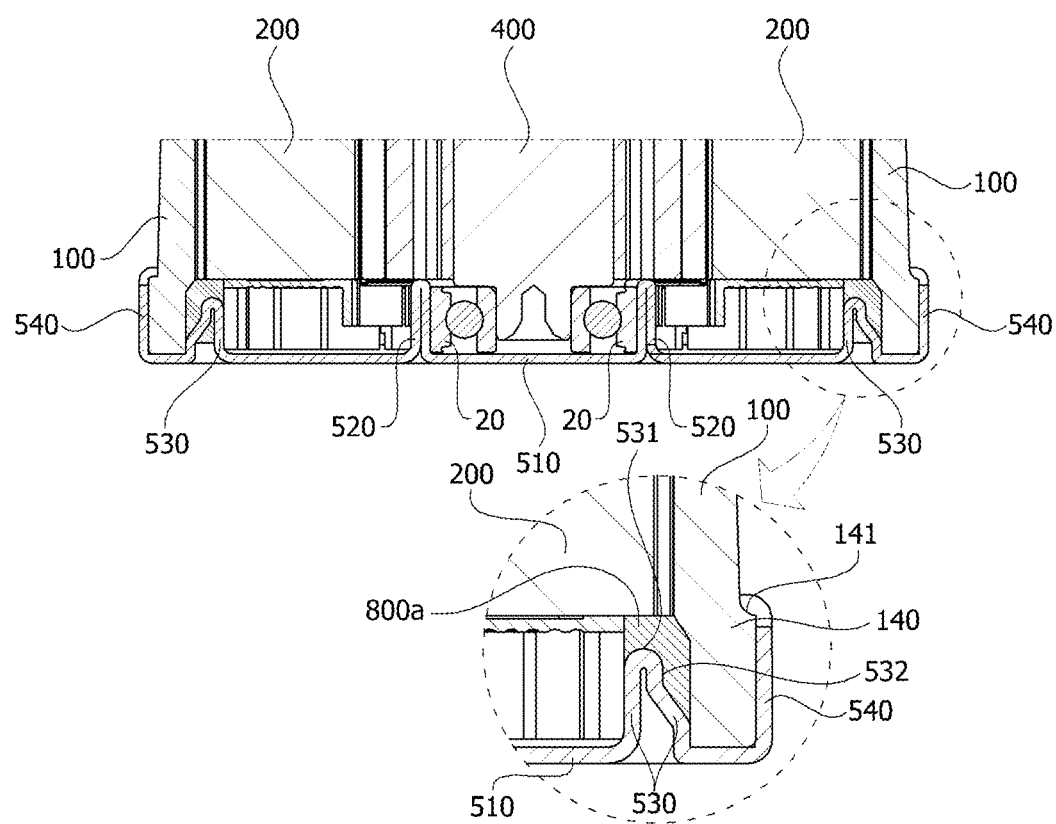
FIG. 14 is a view showing a sealing member disposed on the second protruding part of the motor cover in the motor according to the embodiment.

Meanwhile, referring to FIG. 14, the sealing part may be a sealing member 800a. Here, the sealing member 800a may be formed in a ring shape in consideration of a shape of the second protruding part 530.

The sealing member 800a is disposed to cover the end portion 531 of the second protruding part 530, and one region of the sealing member may be disposed between the inner circumferential surface of the housing 100 and the outer surface 532 of the second protruding part 530. For example, as illustrated FIG. 14, the sealing member 800a may be formed to have a ㄱ-shaped cross-section. Accordingly, the outer surface 532 of the second protruding part 530 may be formed such that a part of a lower portion of the outer surface is bent toward the third protruding part 540.

Figure 15:
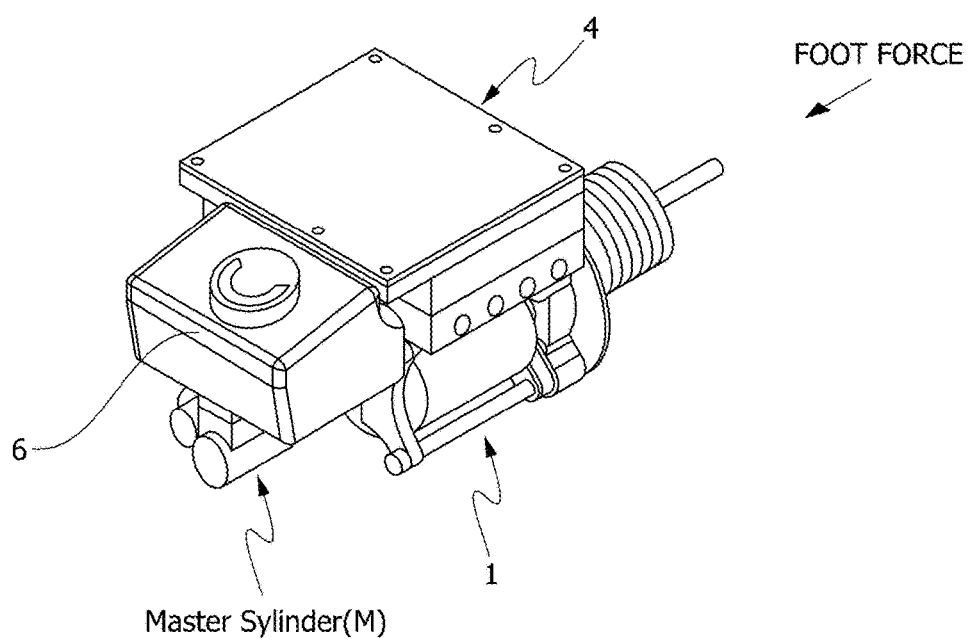
FIG. 15 is a view showing a brake device according to an embodiment.

Hereinafter, a brake device 1000 according to one embodiment will be described with reference to FIG. 15.

The brake device 1000 may include the above-described motor 1, a master cylinder M and an electronic stability control (ESC) 4. Here, as the motor 1 is driven, the master cylinder M may be actuated.

The ESC 4 of the brake device 1000 senses foot power and the brake system is actuated by operation of the motor 1 and pressurization of the master cylinder M so that the foot power is boosted by the ESC 4.

Therefore, since the brake device 1000 may employ the above-described motor 1 when braking a vehicle, instead of a vacuum booster which is conventionally used, it is possible to promote weight-lightening and improved fuel efficiency. Furthermore, the brake device 1000 may perform a braking operation without a vacuum pump.

Although the present invention has been described with reference to the illustrative embodiment thereof, one skilled in the art may understand that it is possible to variously modify and change the present invention without departing from the spirit and scope of the present invention defined in the following claims. In addition, differences relating to such changes and modifications are to be construed as being included within the scope of the present invention as defined in the appended claims.

REFERENCE NUMERALS

| | |
|---|---|
| 1: Motor | 100: Housing |
| 200: Stator part | 300: Rotor part |
| 400: Rotary shaft | 500: Motor cover |
| 600, 600a: Sealing guide part | |
| 700: Sensor magnet assembly | |
| 800: O-ring | 800a: Sealing member |
| 1000: Brake device | |

The invention claimed is:

1. A motor comprising:
a rotary shaft;
a rotor part in which the rotary shaft is disposed;
a stator part disposed outside the rotor part;
a housing configured to accommodate the rotor part and the stator part, and having an opening formed in one side thereof; and
a motor cover disposed at the opening of the housing, wherein the motor cover comprises:
  a motor cover body;
  a first protruding part and a second protruding part that are each formed at a predetermined location radially outward from a center of the motor cover body and configured to protrude from the motor cover body; and
  a third protruding part formed to protrude from an edge of the motor cover body,
wherein a sealing part is disposed between an end portion of the housing, which is disposed between the second protruding part and the third protruding part, and the second protruding part,
wherein the second protruding part is formed to have a ring shape,
wherein the second protruding part is formed so that a part of a lower portion of an outer surface thereof is bent toward the third protruding part,
wherein the sealing part is disposed to cover an end portion of the second protruding part, and
wherein one region of the sealing part is disposed between an inner circumferential surface of the housing and an outer side surface of the second protruding part.

2. The motor of claim 1, comprising a sealing guide part disposed to cover an opening formed in the other side of the housing and support a region of the stator part that is exposed to the outside,
wherein the sealing guide part comprises a grommet configured to support a region of a terminal of the stator part and a sealing cap disposed to cover the opening formed in the other side of the housing.

3. The motor of claim 1, wherein the second protruding part has an end portion formed in a round shape.

4. The motor of claim 1, wherein the sealing part is formed in a ring shape having a n-shaped cross-section.

5. The motor of claim 1, wherein an end portion of the third protruding part is bent toward the housing.

6. The motor of claim 1, wherein:
the motor cover comprises a plurality of bent protruding portions formed along an end portion of the third protruding part and spaced apart from each other; and
the bent protruding portions are bent toward the housing.

7. The motor of claim 1, wherein the stator part comprises:
a stator body;
a terminal having one side disposed to be exposed to the outside of the housing;
a bus bar portion disposed between the stator body and the terminal; and
a conduction medium configured to electrically connect a coil end portion of the stator body and the other side of the terminal.

8. The motor of claim 7, wherein the conduction medium is formed to be flexible.

9. The motor of claim 1, wherein the housing comprises:
a first accommodation recess in which the stator part and the rotor part are disposed;
a second accommodation recess connected to the first accommodation recess to allow one end portion of the rotary shaft to be disposed therein; and
a third accommodation recess connected to the second accommodation recess, and having a gear disposed in the third accommodation recess.

10. The motor of claim 9, wherein the gear is engaged with a thread formed at the one end portion of the rotary shaft to be rotated according to rotation of the rotary shaft.

11. The motor of claim 1, wherein, in the first protruding part formed in a ring shape:
a bearing pocket is formed inside the first protruding part; and
a bearing is disposed in the bearing pocket.

12. A brake device comprising:
the motor according to claim 1;
a master cylinder configured to be actuated according to operation of the motor; and
an electronic stability control (ESC).

13. The motor of claim 1, wherein the sealing part is an O-ring.

14. A motor comprising:
a rotary shaft;
a rotor part in which the rotary shaft is disposed;
a stator part disposed outside the rotor part;
a housing configured to accommodate the rotor part and the stator part, and having an opening formed in one side thereof; and
a motor cover disposed at the opening of the housing, wherein the motor cover comprises:
  a motor cover body;
  a first protruding part and a second protruding part that are each formed at a predetermined location radially outward from a center of the motor cover body and configured to protrude from the motor cover body; and
  a third protruding part formed to protrude from an edge of the motor cover body,
wherein a sealing part is disposed between an end portion of the housing, which is disposed between the second protruding part and the third protruding part, and the second protruding part, wherein the stator part comprises:
  a stator body;
  a terminal having one side disposed to be exposed to the outside of the housing;
  a bus bar portion disposed between the stator body and the terminal; and
  a conduction medium configured to electrically connect a coil end portion of the stator body and the other side of the terminal,
wherein the motor comprises a sealing guide part disposed to cover an opening formed in the other side of the housing and support one region of the stator part that is exposed to the outside,
wherein the sealing guide part comprises a grommet configured to support one region of the terminal and a sealing cap disposed to cover the opening formed in the other side of the housing; and
wherein the grommet is fixed to the housing by a fixing member.

15. A motor comprising:
a rotary shaft;
a rotor part in which the rotary shaft is disposed;
a stator part disposed outside the rotor part;
a housing configured to accommodate the rotor part and the stator part, and having an opening formed in one side thereof; and
a motor cover disposed at the opening of the housing,
wherein the motor cover comprises:
  a motor cover body;
  a first protruding part and a second protruding part that are each formed at a predetermined location radially outward from a center of the motor cover body and configured to protrude from the motor cover body; and
  a third protruding part formed to protrude from an edge of the motor cover body,
wherein a sealing part is disposed between an end portion of the housing, which is disposed between the second protruding part and the third protruding part, and the second protruding part,
wherein the stator part comprises:
  a stator body;
  a terminal having one side disposed to be exposed to the outside of the housing;
  a bus bar portion disposed between the stator body and the terminal; and
  a conduction medium configured to electrically connect a coil end portion of the stator body and the other side of the terminal,
wherein the motor comprises a sealing guide part disposed to cover an opening formed in the other side of the housing and support one region of the stator part that is exposed to the outside,
wherein the sealing guide part comprises a grommet configured to support one region of the terminal and a sealing cap disposed to cover the opening formed in the other side of the housing; and
wherein the grommet and the sealing cap are integrally formed.

* * * * *